United States Patent [19]

Oishi et al.

[11] Patent Number: 4,672,499

[45] Date of Patent: Jun. 9, 1987

[54] MAGNETIC DISK CARTRIDGE INCLUDING A DISK CLEANER

[75] Inventors: Kengo Oishi; Tuyoshi Ono; Wataru Ueno, all of Odawara, Japan

[73] Assignee: Fuji Photo Film Co., Ltd., Japan

[21] Appl. No.: 798,834

[22] Filed: Nov. 18, 1985

[30] Foreign Application Priority Data

Nov. 20, 1984 [JP] Japan .................. 59-176300[U]

[51] Int. Cl.$^4$ ............................................ G11B 23/02
[52] U.S. Cl. ................................................. 360/133
[58] Field of Search ................... 360/133, 97, 135, 137

[56] References Cited

U.S. PATENT DOCUMENTS 4,510,546  4/1985  Asami et al. ..................... 360/133

Primary Examiner—John H. Wolff

Attorney, Agent, or Firm—Pasquale A. Razzano

[57] ABSTRACT

A magnetic disk cartridge has a case, a magnetic disk rotatably housed in the case, a cleaning liner positioned between the magnetic disk and an inner wall surface of the case facing the magnetic disk and extending at least from an inner edge portion to an outer edge portion of the recording area of the magnetic disk, and a lifter positioned between the inner wall surface of the case and the liner. One end portion of the lifter is secured to the inner wall surface of the case, and the other end portion of the lifter is raised obliquely from the inner wall surface of the case to form a rising portion which pushes up the liner and makes the liner uniformly contact the magnetic disk over the area from the inner edge portion to the outer edge portion of the magnetic disk. The lifter is subjected to heat setting when the rising portion is formed.

2 Claims, 4 Drawing Figures

MAGNETIC DISK CARTRIDGE INCLUDING A DISK CLEANER

BACKGROUND OF THE INVENTION

1. Field of the Invention

This invention relates to a magnetic disk cartridge comprising a small-diameter thin magnetic disk which is rotated for recording and reproducing information. This invention particulary relates to a magnetic disk cartridge provided with an improved means for cleaning the magnetic disk.

2. Description of the Prior Art

Floppy disks are widely used as recording media for computers because they are easy to handle and low in cost. The floppy disk comprises a disk-shaped base made of flexible polyester sheet or the like, and a magnetic material layer overlaid on opposite surfaces of the disk-shaped base. The floppy disk is rotated for magnetically recording information on the magnetic material layer by use of a magnetic head.

Utilizing the aforesaid advantages of the floppy disk and the advantage that a magnetic recording medium has over a silver halide photographic film in that the magnetic recording medium can be reused, there have been proposed micro-floppy disks which are smaller than the compact floppy disk and is easier to handle.

There have heretofore been various attempts made to improve the reliability of the floppy disk. For example, the floppy disk has been provided with a hard case, and a dust preventing shutter provided at the aperture of the hard case. Also, it has been proposed to use a smaller magnetic disk as the image recording medium in electronic still cameras. The magnetic disk used for such still cameras comprises a small-diameter thin magnetic recording medium, and a hub secured to the center of the magnetic recording medium. The magnetic disk is rotatably housed in a small case provided at the center thereof with a hub hole for exposing the hub of the magnetic disk. The case also has magnetic head insertion apertures in the upper and lower surfaces for exposing a part of the magnetic disk. The combination of the magnetic disk with the case is called a magnetic disk cartridge.

In the magnetic disk cartridge of the aforesaid type, a liner fabricated of a nonwoven rayon fabric, a nonwoven polyester fabric or the like is positioned between the magnetic disk and an inner wall surface of the case so that the liner lightly contacts the recording surface of the magnetic disk and removes dust or the like from the recording surface as the magnetic disk rotates. Also, a lifter made of a synthetic resin or the like is positioned between the inner wall surface of the case and the liner. One end portion of the lifter is secured to the inner wall surface of the case, and the other end portion thereof is bent up away from the inner wall surface to form a rising portion which resiliently pushes up the liner. The lifter urges the liner into contact with the magnetic disk with a uniform force so that sufficient cleaning effects are obtained. However, in the conventional magnetic disk cartridge, since the rising portion of the lifter is formed by mechanically bending a flat lifter member, the rising portion is weakened by long use of the magnetic disk cartridge, and the force with which the liner is pushed by the rising portion becomes too small to allow the liner to contact the magnetic disk with sufficient force, and the cleaning effect deteriorates gradually. Also, as the lifter weakens, the running torque of the magnetic disk decreases, and it is therefore not always possible to maintain a constant running torque.

SUMMARY OF THE INVENTION

The primary object of the present invention is to provide a magnetic disk cartridge having a cleaner and a lifter wherein the lifter does not weaken with time and effective cleaning of the magnetic disk is maintained constantly.

Another object of the present invention is to provide a magnetic disk cartridge which ensure the running torque of the magnetic disk stays constant.

The present invention provides a magnetic disk cartridge having a case, a magnetic disk rotatably housed in the case, a cleaning liner positioned between the magnetic disk and an inner wall surface of the case facing the magnetic disk and extending at least from an inner edge portion to an outer edge portion of the recording area of the magnetic disk, and a lifter positioned between the inner wall surface of the case and the liner, one end portion of the lifter being secured to the inner wall surface of the case and the other end portion of the lifter being raised obliquely upwardly from the inner wall surface of the case to form a rising portion which pushes up the liner and makes the liner uniformly contact the magnetic disk over the area from the inner edge portion to the outer edge portion of the magnetic disk, wherein said lifter is subjected to heat setting when said rising portion is formed.

The material of the lifter should preferably be a plastic material which is resilient and suitable for heat setting.

In the magnetic disk cartridge of the present invention, by using a heat setting process to form the rising portion of the lifter, it is possible to minimize weakening of the rising portion during use of the magnetic disk cartridge. Therefore, the force with which the lifter pushes against the liner does not decrease, and the cleaning effects of the liner are maintained. Also, it becomes possible to stabilize the running torque of the magnetic disk. Further, it is possible to minimize variations in the performance of the formed lifter.

DESCRIPTION OF THE PREFERRED EMBODIMENTS

The present invention will hereinbelow be described in further detail with reference to the accompanying drawings.

Figure 1:
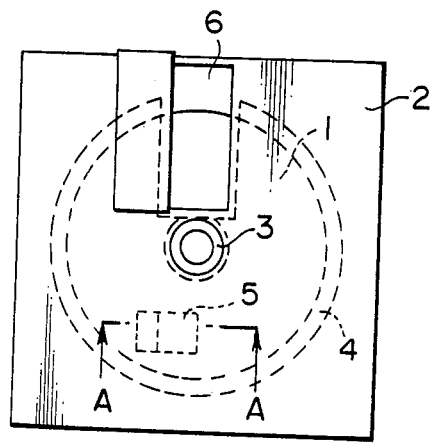
FIG. 1 is a plan view showing an embodiment of the magnetic disk cartridge in accordance with the present invention.
Figure 2:
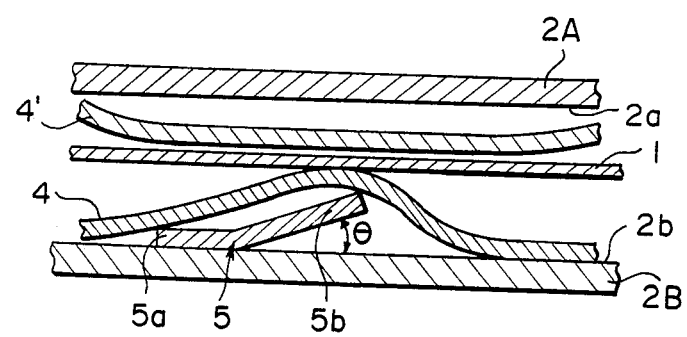
FIG. 2 is a sectional view taken along line A—A of FIG. 1.

FIG. 1 is a plan view showing an embodiment of the magnetic disk cartridge in accordance with the present invention, and FIG. 2 is a sectional view taken along line A—A of FIG. 1.

A magnetic disk 1 housed in a cartridge case 2 consisting of an upper half 2A and a lower half 2B is rotatably supported at its center by a core 3. Cleaning liners 4 and 4' having an approximately circular shape and covering the magnetic disk 1 and which are made of a nonwoven rayon fabric, a nonwoven polyester fabric or the like are respectively positioned between the magnetic disk 1 and inner wall surfaces 2a and 2b of the upper half 2A and the lower half 2B. The liners 4 and 4' are secured at some points by heat sealing or the like to the inner wall surfaces 2a and 2b. Though the liners 4 and 4' are approximately circular in this embodiment, the shape and size of the liners 4 and 4' may be selected arbitrarily insofar as the liners 4 and 4' extend at least from the inner edge portion to the outer edge portion of the recording area of the magnetic disk 1. Between the liner 4 and the inner wall surface 2b is positioned a lifter 5 fabricated of a resilient plastic material such as polyethylene terephthalate or polycarbonate film, the size of which is preferably about 3 cm×2 cm at maximum plastic and having one end portion 5a secured to the inner wall surface 2b and the other end portion raised obliquely from the inner wall surface 2b to form a rising portion 5b. The rising portion 5b acts to push up the liner 4 and make it uniformly contact the magnetic disk 1 over the area from the inner edge portion to the outer edge portion of the recording area of the disk 1. Being pushed up by the lifter 5, the liner 4 uniformly contacts the magnetic disk 1 with a constant force in sliding contact over the recording area of the disk 1 and thereby removes dust or the like from the disk surface facing the liner 4 as the disk 1 is rotated.

Figure 3:
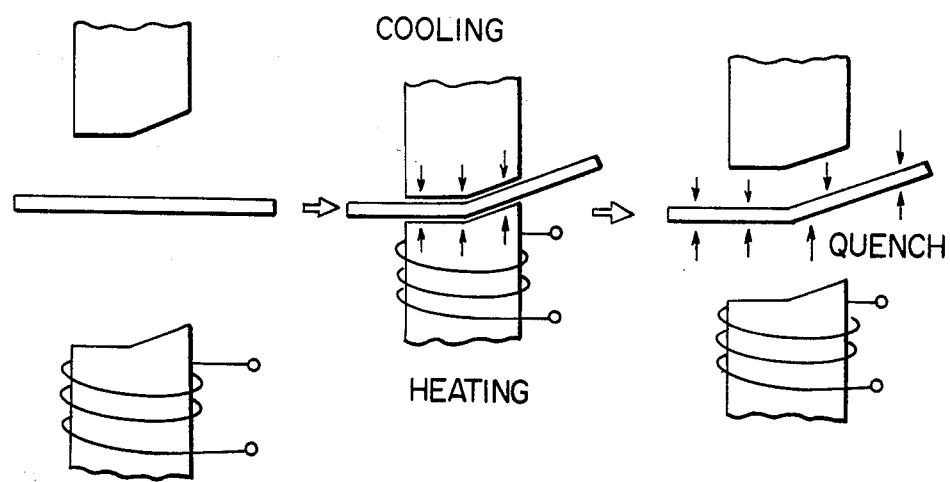
FIG. 3 is a schematic view showing the heat setting processing of the lifter of the magnetic disk cartridge in accordance with the present invention.

The rising portion 5b of the lifter 5 is formed by heat setting, as shown in FIG. 3.

A cooling member having a convex surface on the lifter member side is positioned on the upper surface side of a flat lifter member fabricated of a plastic material, and a heating member having a concave surface on the lifter member side is positioned on the lower surface side of the lifter member. The lifter member is subjected to bending by being pressed for a predetermined time between the cooling member and the heating member. After the bending is finished, the lifter member is cooled rapidly to complete the heat setting process. When the thickness of the lifter is within the range of about 75 μm to 175 μm, the bending should preferably be conducted at a temperature within the range of 170° C. to 200° C. for 2 to 5 seconds as is known in plastics such as polyethylene terephthalate and polycarbonate film will take a heat set at this time and temperature range. If the heat setting temperature is below this range or the heat setting time less than the aforesaid range, the lifter will not have sufficient strength. If the heat setting temperature is higher than the aforesaid range or the heat setting time is longer than the aforesaid range, the lifter will be distorted.

Figure 4:
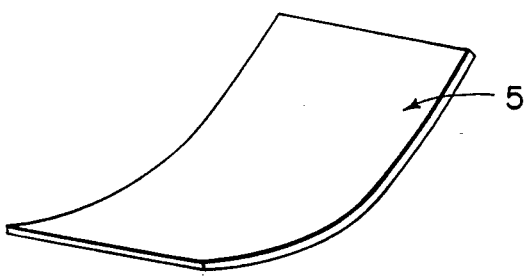
FIG. 4 is a perspective view showing the lifter in another embodiment of the magnetic disk cartridge in accordance with the present invention.

The lifter thus formed by heat setting does not weaken during use, unlike a conventional lifter, which is formed mechanically. For example, when the bending angle θ of the rising portion of the lifter shown in FIG. 1 was 20° and the lifter was used at a load of 1 g for two months, the strength of a conventional lifter formed mechanically at normal temperature declined by 60%, while the decline in strength of the lifter formed by heat setting was within the range of 15% to 20%. When the bending angle θ was 7°, the strength of the conventional lifter declined by 40%, and that of the lifter formed by heat setting 10%. Thus the lifter formed by heat setting shows a considerable reduction in the rate of decline in strength. Also, lifters formed by the conventional method show large variations in the degree of weakening, so it is not always possible in designing the lifters to take into consideration the degree of weakening. On the other hand, in the case of the lifters formed by heat setting, it is possible to decrease the variation in the degree of weakening to one half or less compared to conventional lifters. The shape of the lifter is not limited to the one shown in FIG. 2, and may be bow-like as shown in FIG. 4. Though the lifter 5 is positioned only between the liner 4 and the inner wall surface 2b of the lower half 2B in the aforesaid embodiment, it may also be positioned between the liner 4' and the inner wall surface 2a of the upper half 2A. When recording is conducted only on one surface of the magnetic disk as in the case of the magnetic disk cartridge for still cameras, the liner and the lifter may be positioned only on the recording surface side.

What is claimed is:

1. A magnetic disk cartridge having a case, a magnetic disk positioned in the case and adapted to rotate therein, a cleaning liner positioned between the magnetic disk and an inner wall surface of the case facing the magnetic disk and extending at least from an inner edge portion to an outer edge portion of the recording area of the magnetic disk, and a lifter positioned between the inner wall surface of the case and the liner, one end portion of the lifter being secured to the inner wall surface of the case and the other end portion of the lifter being raised obliquely upwardly from the inner wall surface of the case to form a rising portion which pushes up the liner and makes the liner uniformly contact the magnetic disk over the area from the inner edge portion to the outer edge portion of the magnetic disk, wherein said lifter is formed of a heat settable material selected from the group consisting of polyethylene terephthalate film and polycarbonate film, said rising portion of the lifter being formed during heat setting.

2. A magnetic disk cartridge as defined in claim 1 wherein said heat setting is conducted at a temperature within the range of 170° C. to 200° C. for a period within the range of 2 to 5 seconds.

* * * * *